US009360994B2

(12) United States Patent
Moore et al.

(10) Patent No.: US 9,360,994 B2
(45) Date of Patent: Jun. 7, 2016

(54) PARTIAL-HEIGHT PANES AS A METHOD FOR OPTIMIZING PALETTE LAYOUT AND SCREEN REAL ESTATE USAGE

(75) Inventors: Kenneth B. Moore, Seattle, WA (US); Michael D. Talvensaari, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2969 days.

(21) Appl. No.: 11/673,310

(22) Filed: Feb. 9, 2007

(65) Prior Publication Data

US 2014/0282206 A1    Sep. 18, 2014

(51) Int. Cl.
*G06F 3/048* (2013.01)
*G06F 3/0482* (2013.01)
*G06F 3/0484* (2013.01)
*G06F 3/0481* (2013.01)

(52) U.S. Cl.
CPC .......... *G06F 3/0482* (2013.01); *G06F 3/04817* (2013.01); *G06F 3/04845* (2013.01)

(58) Field of Classification Search
USPC ......................................... 715/779
See application file for complete search history.

(56) References Cited

U.S. PATENT DOCUMENTS

2003/0063126 A1 * 4/2003 Yanchar et al. ............... 345/781
2004/0025112 A1 * 2/2004 Chasen et al. ............. 715/501.1

OTHER PUBLICATIONS

Google Desktop—Features; Improved Sidebar, Google Gadgets [online] [Retrieved on: Feb. 8, 2007] Retrieved from: http://desktop.google.com/features.html.

* cited by examiner

*Primary Examiner* — Angie Badawi
(74) *Attorney, Agent, or Firm* — Kilpatrick Townsend & Stockton LLP

(57) ABSTRACT

A tool panel docking application is described that manages the docking of tool panels and palettes on an edge of an IDE workspace. As the user selects to dock various tool panels, the IDE monitors the positioning of each panel so as not to overlap the content of any of the individual panels making up the combined docked palettes and that allow the user to select how much of the underlying workspace is obscured by the combined docked palettes.

25 Claims, 19 Drawing Sheets

800 — Receive an indication to dock one or more palettes to one of a plurality of edges of an electronic workspace.

801 — Join the individual palettes, which may be a single panel or individual tabbed palettes, into a docked palette, wherein each of the individual palettes are positioned to prevent overlapping any of the other palettes.

802 — Fix the docked palette to the selected edge.

803 — Display one or more user interface controls associated with the docked palette.

804 — Detect manipulation from any of the user interface controls, where the manipulation affects an amount of electronic workspace that is concealed by the docked palette.

FIG 8

PARTIAL-HEIGHT PANES AS A METHOD FOR OPTIMIZING PALETTE LAYOUT AND SCREEN REAL ESTATE USAGE

TECHNICAL FIELD

The present invention is related, in general, to computer software applications and, more specifically, to a development environment managing positioning of tool palettes.

BACKGROUND

Integrated development environments (IDEs) are typically used to create various computer applications, graphics, documents, and the like. Many IDEs and design applications use a palette or panel model where small rectangular windows contain controls for a specific set of functionality tools. In almost all of the IDEs that use a palette or panel model, the designer can typically drag the palettes out of their docked location and rearrange them to float on the screen wherever the designer wants. This ability to "float" the palettes wherever the designer desires is useful, but sometimes it is more desirable to organize the palettes in a systematic fashion and/or attach them to the edge of the workspace.

There are generally two different models used in IDEs that implement an edge docking mechanism for its palettes. The first model creates a stacked column on whichever edge the designer wishes to dock the palettes. IDEs, such as Adobe Systems Inc.'s FIREWORKS®, DREAMWEAVER®, and FLASH® each allow designers to dock tool palettes in such a stacked column on the edges of the workspace. In such stacked column implementations one of the typical properties is that no matter how much vertical height the palettes in the column take up, the column itself takes up the full height of the workspace. Therefore, in extreme cases, such as when there is only one, short palette docked on the edge, the rest of the column space below the palette is unused but still obscures the workspace. Such wasted space is typically undesirable to designers, who generally prefer as big a workspace as possible.

The second model generally used for palette management in IDEs provides for stashing the palettes on the edges in collapsible windows. For example, Adobe Systems, Inc.'s INDESIGN® IDE stashes palettes on the edges of the design workspace. Designers drag the palettes to the workspace edge which allows the palette to slide away into the side of the workspace screen. When the designer desires to access the functionality in any of the stashed palettes, the user selects a visible title bar or panel tab protruding from the edge of the workspace which triggers the selected palette or panel to slide out to be accessible to the designer on the workspace. When the palette slides out, it obscures the subject matter in the design workspace, but does not extend the obscuration beyond the physical dimensions of the selected palette, as is common in the stacked palette mechanism. While the stashed palette model allows the user to view more of the design space while keeping the various tool palettes and tool panels accessible, the IDE does not manage the palette layout. Without managing the layout, the various palettes and panels that are docked and slid into the edges can overlap other stashed palettes and panels. Therefore, it is possible to obscure existing stashed palettes with additional stashed palettes. This mechanism, then, generally forces the user to keep moving the palettes around to maintain free access to the functionality and tools in the other palettes. Requiring the user to constantly monitor and manage the workspace layout creates multiple, undesirable usability issues which may often make the user interface difficult to manipulate.

BRIEF SUMMARY

The present invention and various representative embodiments of the present invention are directed to a systems, methods, and computer program products that manage the docking of tool panels and palettes on an edge of an IDE workspace. As the user selects to dock various tool panels, the IDE monitors the positioning of each panel so as not to overlap the content of any of the individual panels making up the combined docked palettes and that allow the user to select how much of the underlying workspace is obscured by the combined docked palettes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6C is a screenshot illustrating an IDE configured according to one embodiment of the present invention;

FIG. 8 is a flowchart illustrating example steps executed to implement one embodiment of the present invention.

DETAILED DESCRIPTION

The palettes and panels implemented in various IDEs generally fall into two different classes: fixed-height and variable-height. Fixed-height palettes, as the name suggests, comprise a panel or palette that does not vary in height. For example, many text object panels have a fixed number of options to pick from which results in a palette that may be a fixed number of pixels tall based upon the layout of the controls in the palette. A user is not allowed to resize fixed-height panels. Other palettes and panels have a height that can be varied, i.e., variable-height palettes. For example, many graphical IDEs allow for a design document to have multiple layers. To complement the multi-layer capability, many of these IDEs provide layer panels that provide a list of the layers included in the document in addition to various controls that the user can manipulate to edit the layers in the document. Because the number of layers in a particular document is usually not limited to a fixed amount, the layer panels oftentimes contain a scrolling list. The user may then re-size the panel to see more or fewer of the layer.

It should be noted that the terms palette and panel refer not only to palettes and panels that display a single tool or functionality, but also to tabbed palettes and tabbed panels, which are palette and panel units that contain multiple controls for multiple tools or functionalities that are stacked on top of each other within the palette or panel unit and selectable by the user through menu tabs.

Figure 1A:
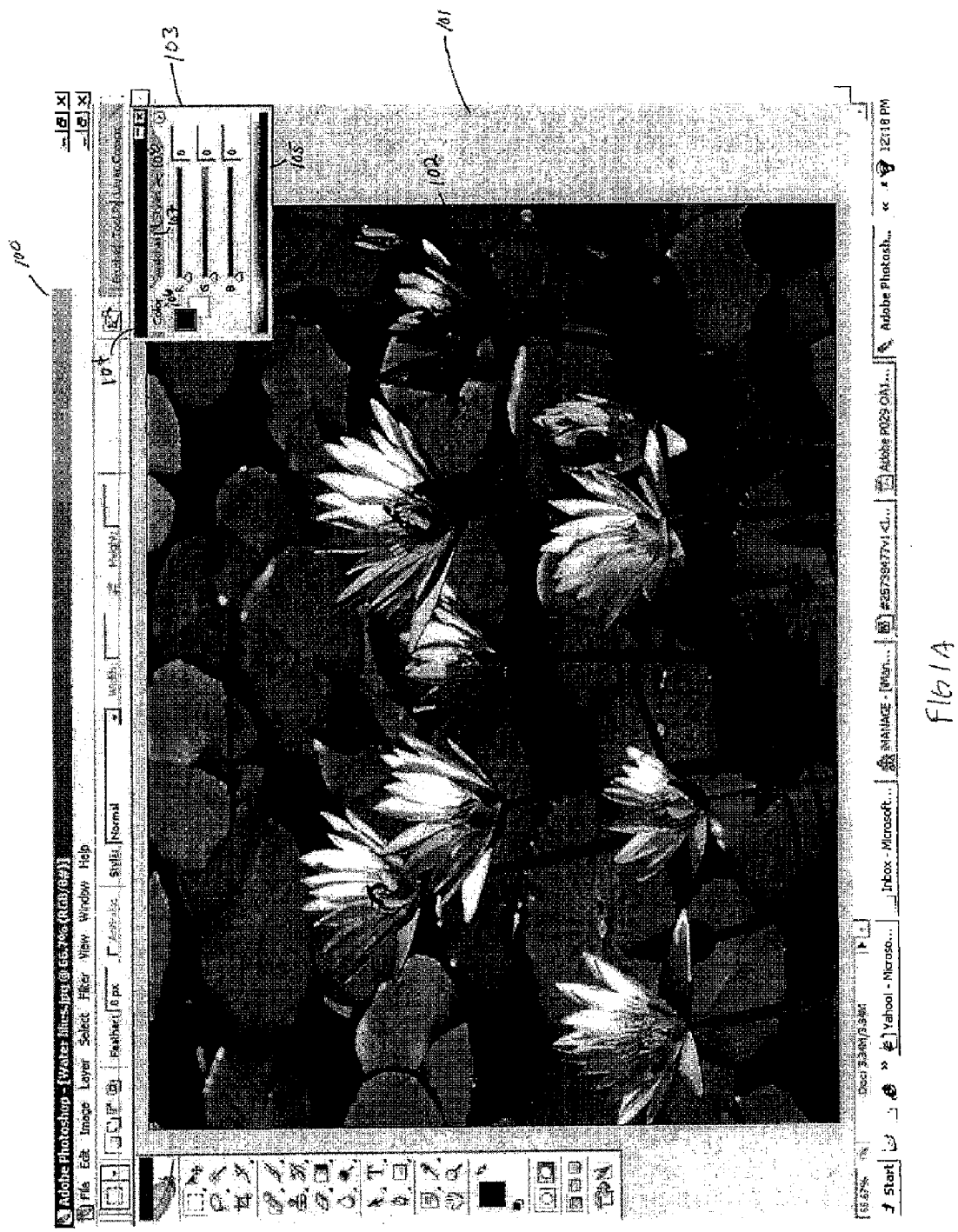
FIG. 1A is a screenshot illustrating an IDE configured according to one embodiment of the present invention.

FIG. 1A is a screenshot illustrating IDE 100 configured according to one embodiment of the present invention. IDE 100 includes design workspace 101 in which image 102 has been placed for editing. Docked palettes 103 provides a tabbed palette that presents color tool 106, swatches tool 107, and styles tool 108. Docked palettes 103 is docked to the edge of design workspace 101. The illustrated example appears similar to existing palette mechanisms that allow for palettes to either float on the workspace or be docked on the edge. However, IDE 100 monitors the dimensions of docked palette 103 while the user operates with the application. The tabbed palette of color tool 106, swatches tool 107, and styles tool 108 is a fixed-height palette. Therefore, the user cannot resize it by manipulating bottom edging 105. Docked palettes 103 is available for interaction by the user, but only obscures that portion of design workspace 101 and image 102 as necessary to present its fixed dimension.

The user may dock and undock various panels and palettes, such as docked palette 103. When the user dragged docked palette 103 into its currently illustrated docked state, IDE 100 added a certain amount of padding that represented top edging 104 and bottom edging 105. Top and bottom edging 104 and 105 are added by IDE 100 as visual indicators for the user to understand the context of the docking action. These visual indications enhance the user experience and the usability by providing visually intuitive structures that convey to the user that the previously floating panels have now been docked on the edge within a containing rectangle.

It should be noted that in additional and alternative embodiments of the present invention, the additional padding and/or visual indicators are not added to the docked palettes or panels. The example embodiment illustrated in FIG. 1A does not limit the various embodiments to only using such features.

Figure 1B:
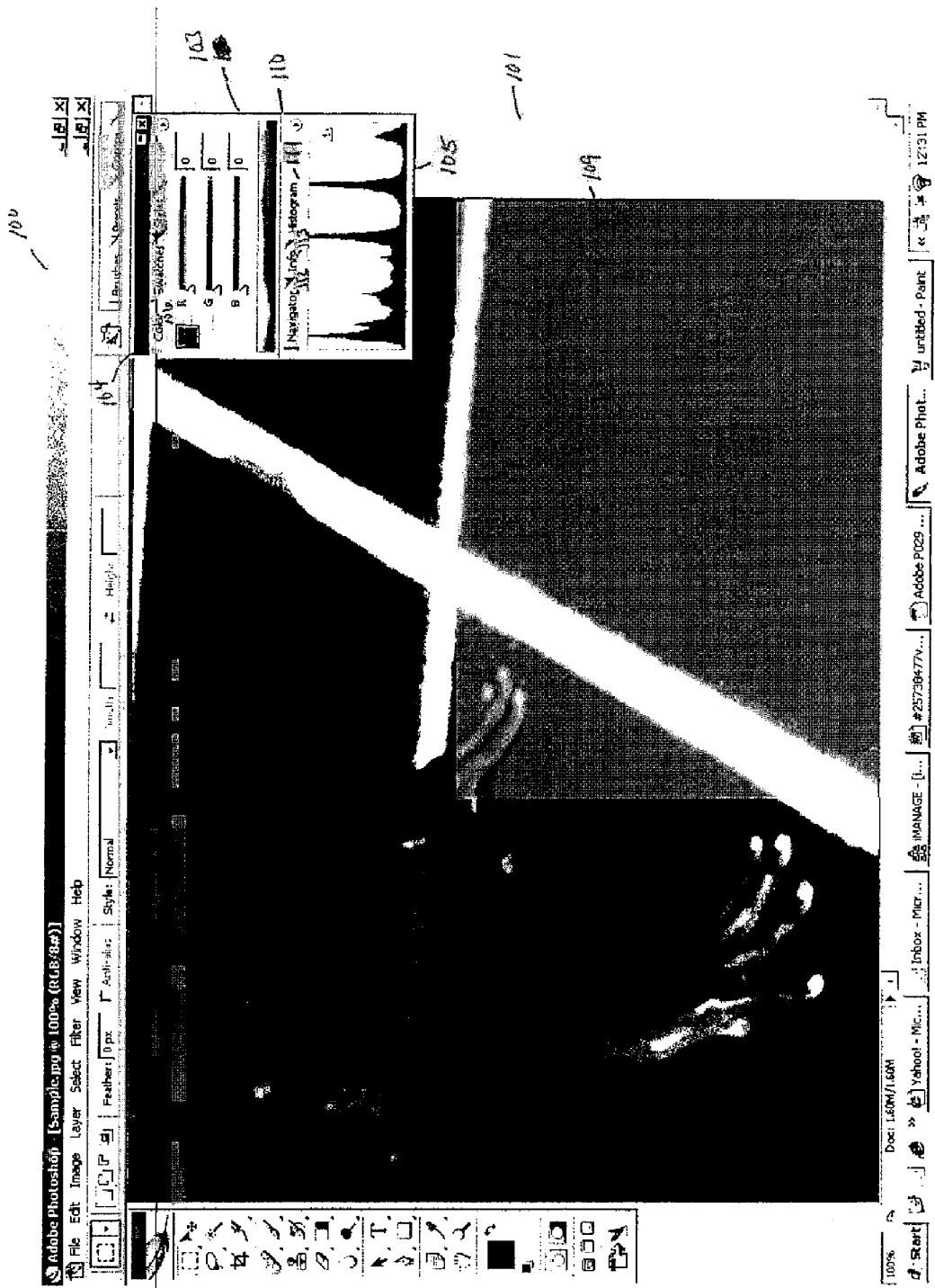
FIG. 1B is a screenshot illustrating an IDE configured according to one embodiment of the present invention.

FIG. 1B is a screenshot illustrating IDE 100 configured according to one embodiment of the present invention. Image 109 has been placed in design workspace 101 for modification. In the example illustrated, docked palette 103 now contains two different tabbed palettes: the first tabbed palette containing color tool 106, swatches tool 107, and styles tool 108 and the second tabbed palette containing histogram tool 111, navigator tool 112, and info tool 113. The second tabbed palette is visually separated from the first tabbed palette by divider 110. If either the first or second tabbed palette were of variable height, the user would be able to manipulate the sizing and vertical positioning of docked palette 103 by dragging divider to the desired dividing location. However, the tabbed palettes making up docked palettes 103 in FIG. 1B are of fixed height and, thus, their respective sizes may not be manipulated by the user.

IDE 100 monitors the layout of docked palettes 103, such that when the user drags the second tabbed palette containing histogram tool 111, navigator tool 112, and info tool 113 to add to docked palettes 103, IDE 100 places the second tabbed palette adjacent to the first tabbed palette and envelopes the combined palettes with the additional padding to create visual indicators, including top and bottom edging 104 and 105 that convey to the user that both tabbed palettes are now a part of the same docked palettes 103. Even if the user attempted to drag the second tabbed palette to overlap the docked palettes 103, IDE 100 will, instead snap the second tabbed palette to docked palettes 103 in the appropriate adjacent location. Again, the now-expanded docked palettes 103 obscures part of design workspace 101 and image 109, but only to the extent necessary to display the fixed vertical height's of the combined tabbed palettes.

Figure 2A:
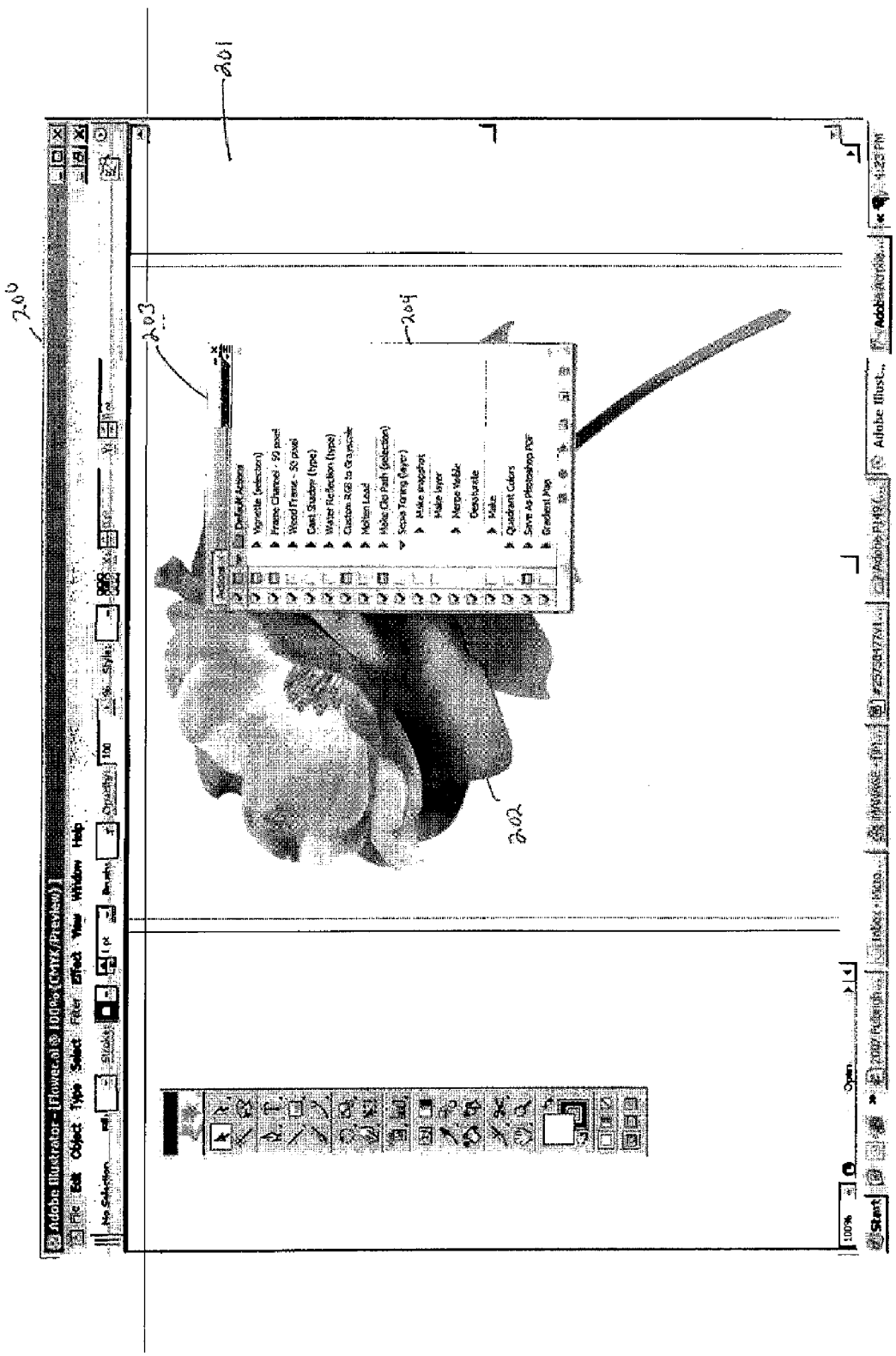
FIG. 2A is a screenshot illustrating an IDE configured according to one embodiment of the present invention.

FIG. 2A is a screenshot illustrating IDE 200 configured according to one embodiment of the present invention. In general operation of IDE 200, a designer places graphic 202 in design workspace 201 in order to create and edit graphic 202. IDE 200 provides numerous tools and functionality to assist the designer. These tools and functions are often presented in panels and palettes that are displayed to the designer in design workspace 201. As in IDEs that are not configured according to the illustrated embodiment in FIG. 2A, a tool panel, such as actions panel 203, may be placed, as shown, floating in design workspace 201. Actions panel 203 is a variable-height palette, as evidenced by scroll bar 204. This allows the designer to modify the vertical size of actions panel 203 in order to display more or less of its options. While floating panels provide good flexibility to designer, often times, a designer desires a more organized workspace that can maximize the contiguous visible area of design workspace 201.

Figure 2B:
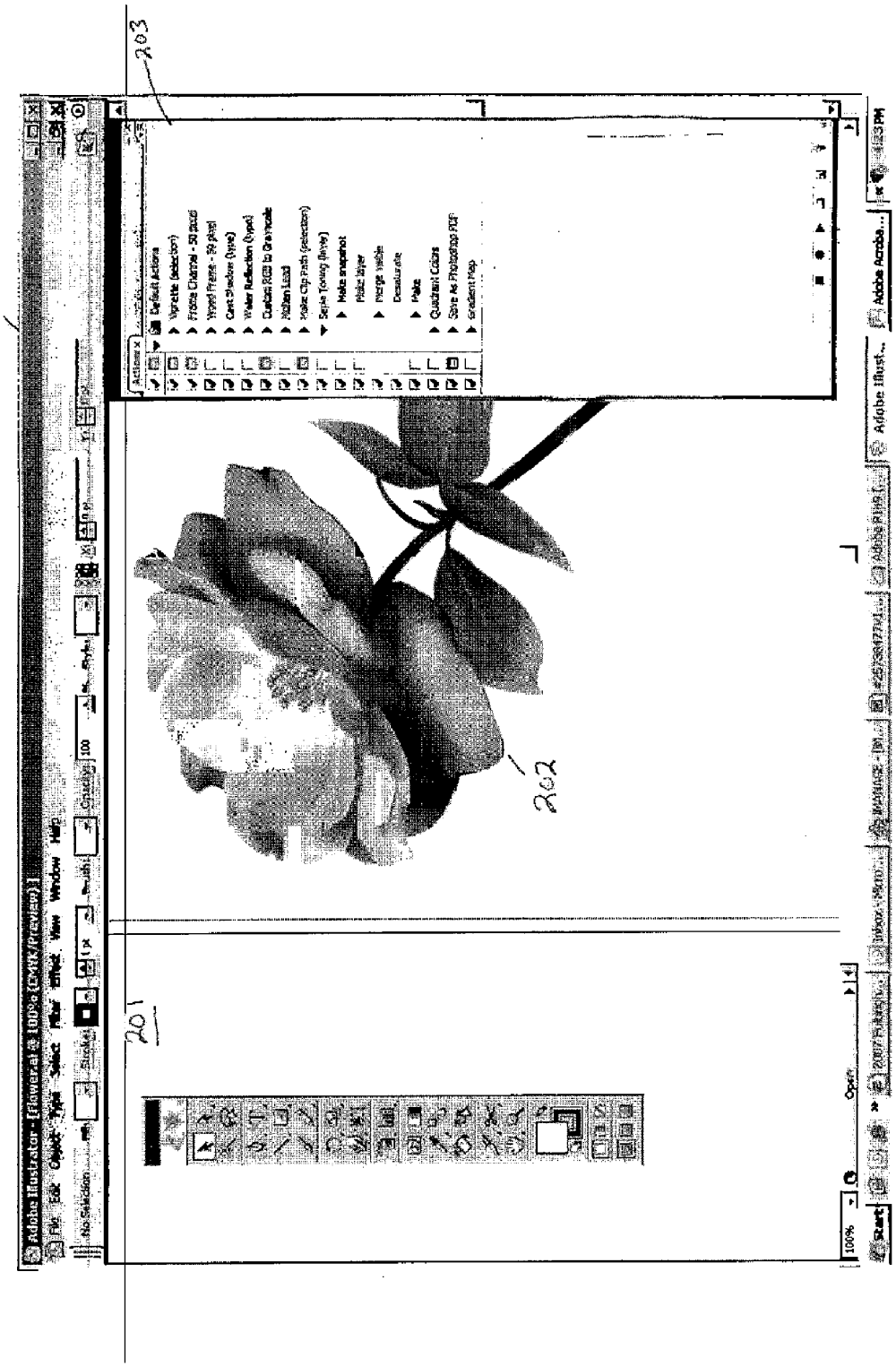
FIG. 2B is a screenshot illustrating the IDE in which the actions panel has been docked to the edge of design workspace.

FIG. 2B is a screenshot illustrating IDE 200 in which actions panel 203 has been docked to the edge of design workspace 201. When a designer selects to dock actions panel 203, IDE 200 positions actions panel 203 adjacent to the scroll bar of design workspace 201 and enlarges actions panel 203 to fit the vertical height of design workspace 201. In comparison with the embodiment illustrated in FIGS. 1A and 1B, IDE 200 expands the vertical size of variable-height palettes, such as actions panel 203, while it would maintain the vertical height of fixed-height palettes, such as docked palettes 103 (FIGS. 1A & 1B). In order to expand actions panel 203 to fit the vertical height of design workspace 201, IDE 200 adds filler space 206 and adds docking padding 205 which visually indicates to the designer that actions panel 203 has been docked. IDE 200 does not need to add filler space 206 when actions panel 203 contains enough information to fill in the entire vertical height.

Figure 2C:
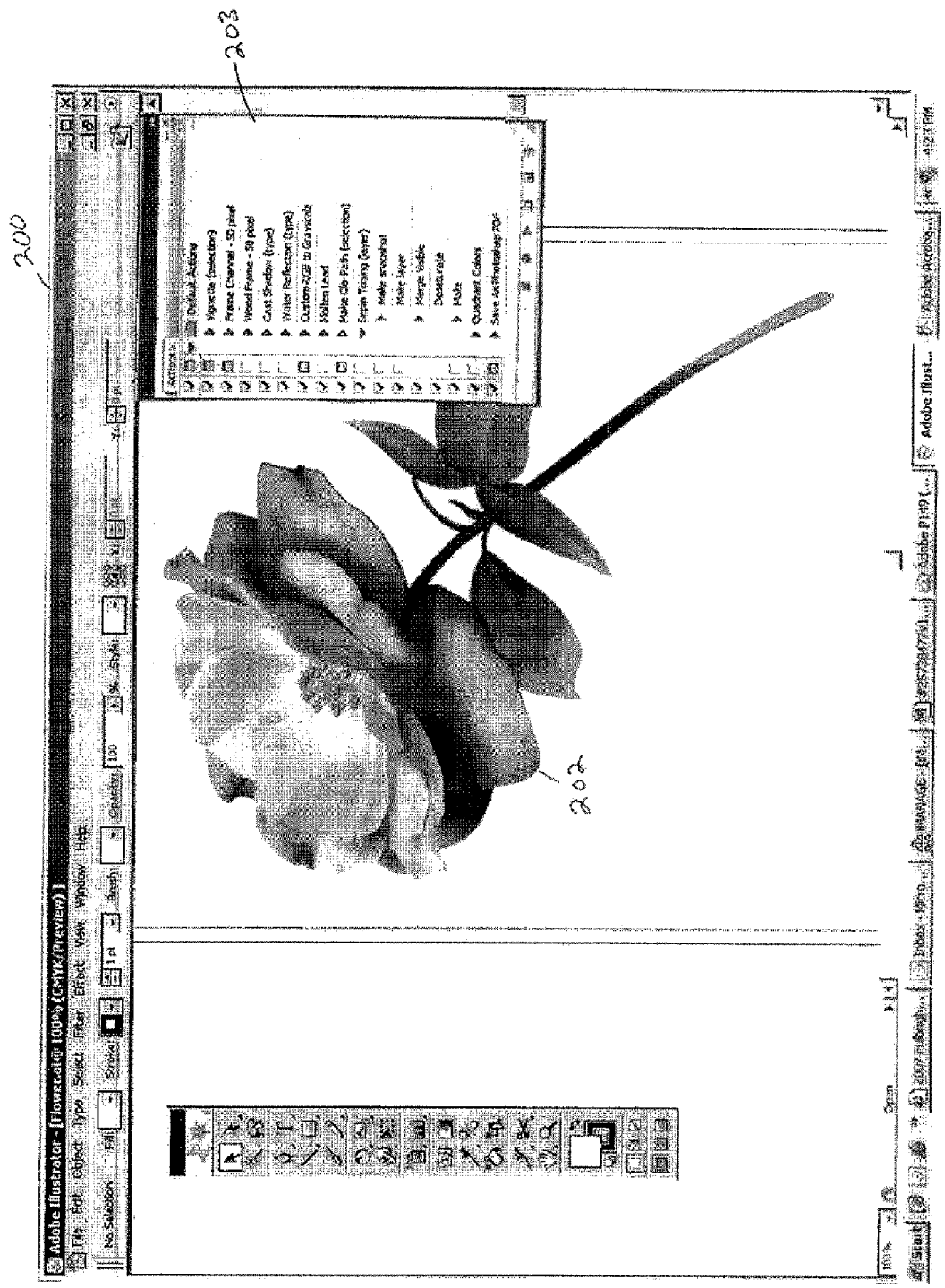
FIG. 2C is a screenshot illustrating an alternative embodiment of an IDE configured according to an additional and/or alternative embodiment of the present invention.

It should be noted that in implementing the multiple embodiments of the present invention, additional and/or alternative embodiments may not expand the size of variable-height palettes, but instead maintain a similar height to the floating version of the same panel. For example, FIG. 2C is a screenshot illustrating an alternative embodiment of IDE 200 configured according to an additional and/or alternative embodiment of the present invention. As the designer docks actions panel 203 to the edge of design workspace 201, IDE 200 maintains the vertical height of actions panel 203, while adding docking padding 205 visually indicating to the designer that actions panel 203 has been docked. In the embodiment of IDE 200 illustrated in FIG. 2C, more of graphic 202 is visible in the space under the docked actions panel 203.

Figure 3A:
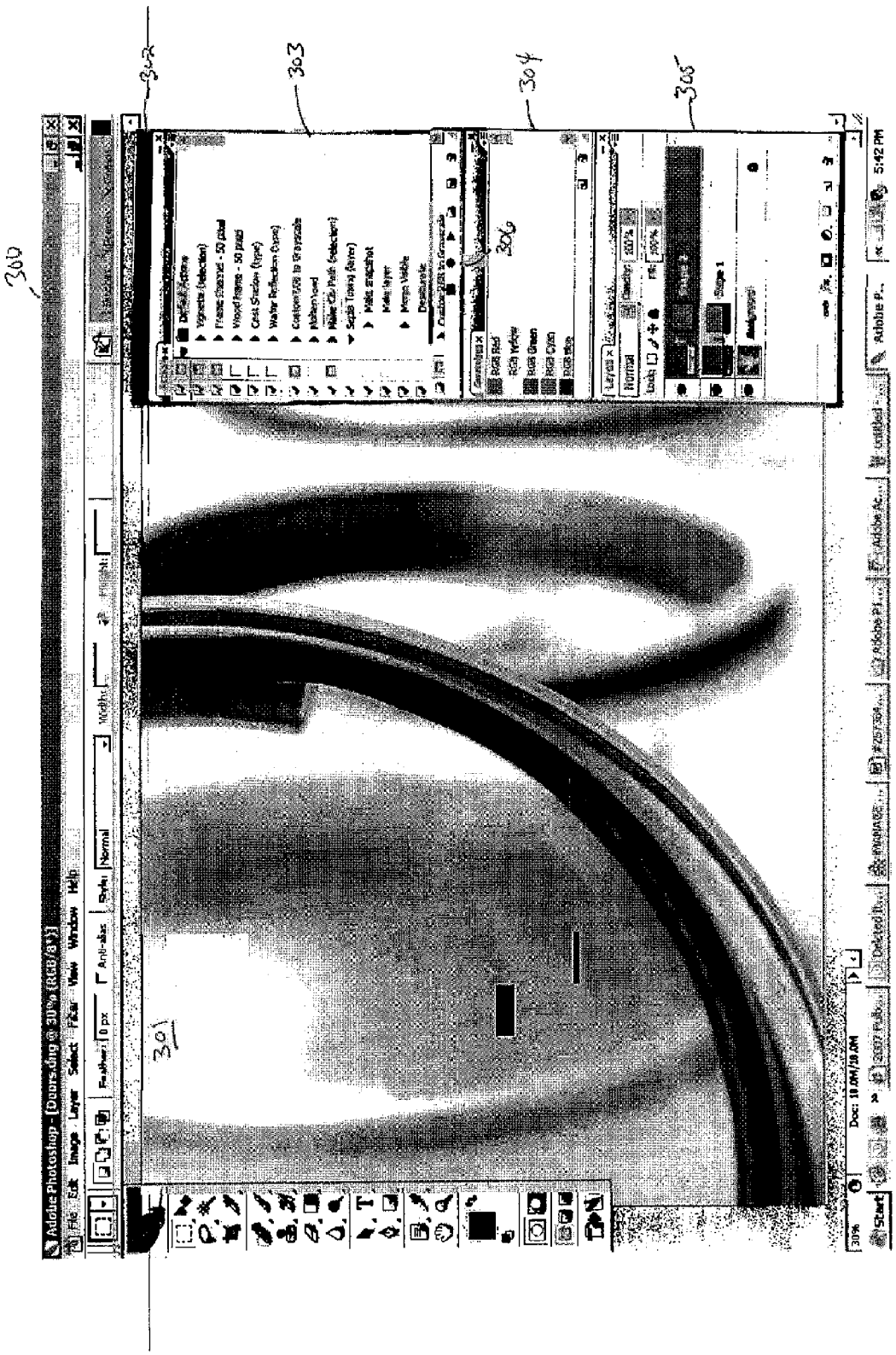
FIG. 3A is a screenshot illustrating an IDE configured according to one embodiment of the present invention.

FIG. 3A is a screenshot illustrating IDE 300 configured according to one embodiment of the present invention. Docked palettes 302 include actions panel 303, swatches panel 304, and layers panel 305, all of which are variable-height panels. While docked on the edge of design space 301, the user can resize individual panels within docked palettes 302. In the illustrated example, the user desires to modify the vertical height of actions panel 303. The user performs this modification by selecting and dragging divider 306.

Figure 3B:
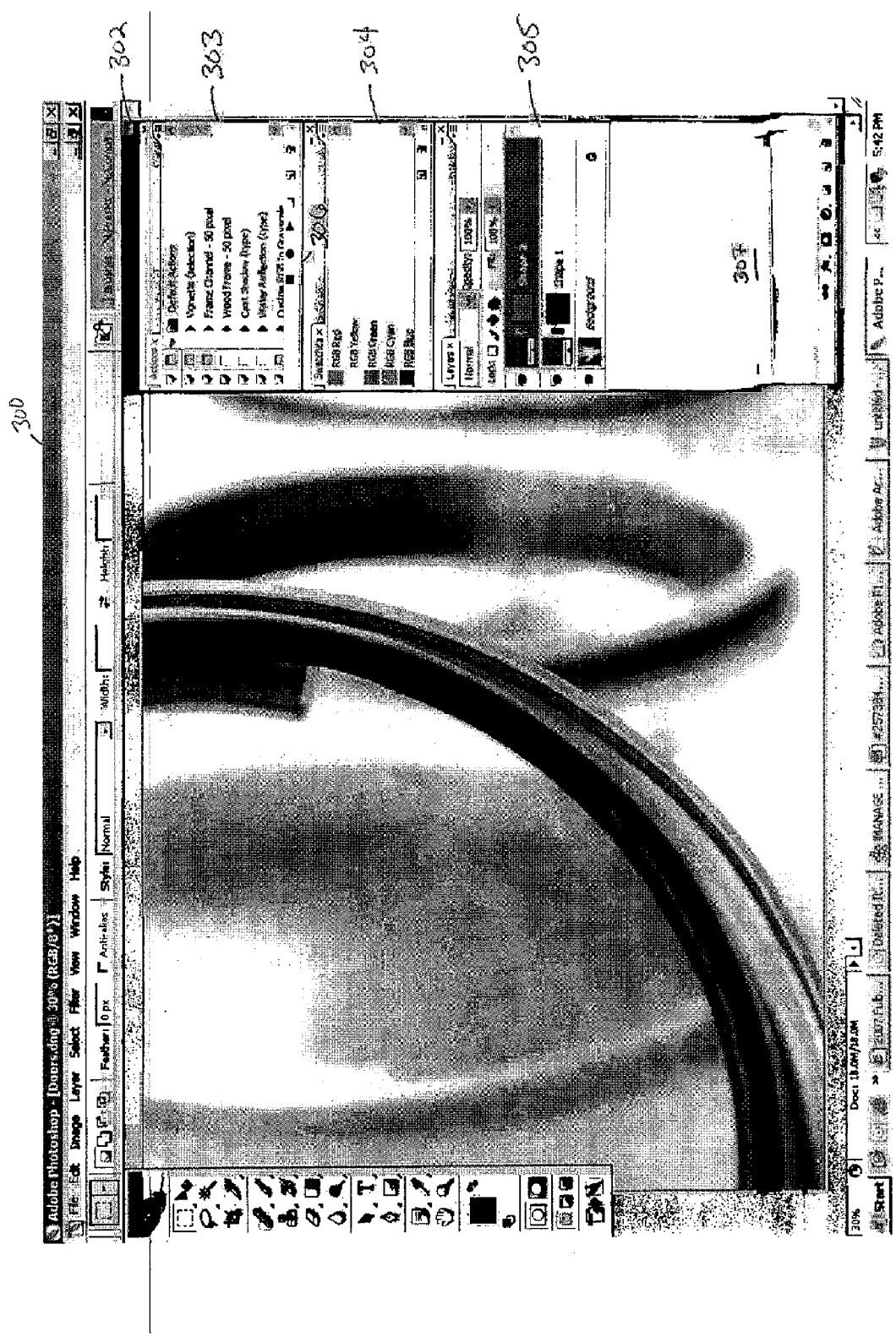
FIG. 3B is a screenshot illustrating the IDE after modifying the vertical height of the actions panel.

FIG. 3B is a screenshot illustrating IDE 300 after modifying the vertical height of actions panel 303. In executing the desired modification, IDE 300 maintains the vertical height of docked palettes 302 to the vertical height of design space 301. The embodiment illustrated in FIG. 3B automatically expands variable-height panels to the size of design space 301. As the user drags divider 306 to decrease the size of actions panel 303, less of the content it contains is visible, and IDE 300 adds filler space 307 to accommodate maintaining the vertical height of docked palettes 302.

It should be noted that in additional and/or alternative embodiments of the present invention, IDE 300 would analyze the content of swatches panel 304 and layers panel 305 to determine which panel includes more hidden content. Based on this analysis, IDE 300 would select to expand the panel with the most hidden content while leaving the remaining panel static in size, unless the additional space added to uncover all of the hidden content in the expanded panel would not add up to maintain docked palettes 302 at the size of design space 301.

Figure 3C:
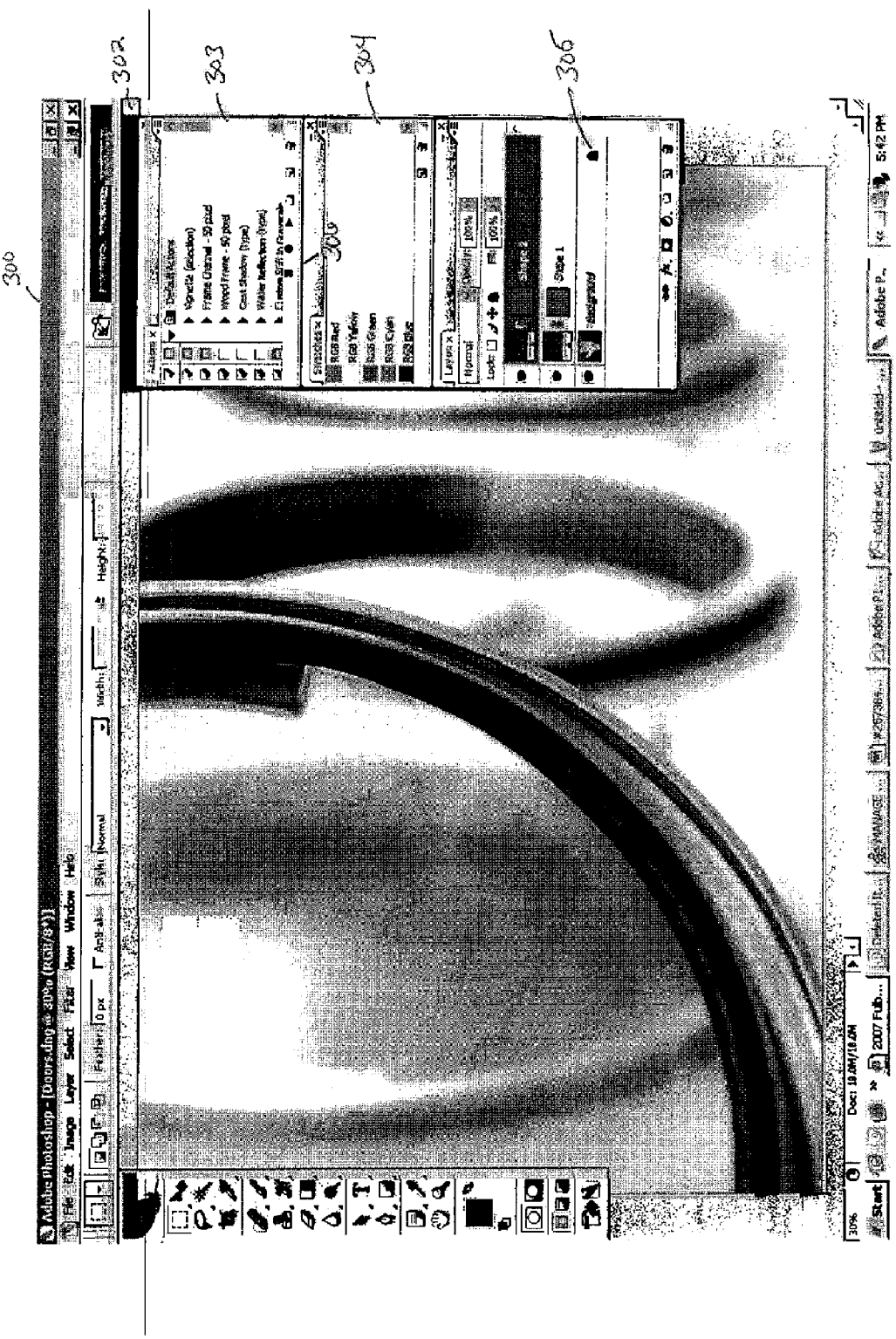
FIG. 3C is a screenshot illustrating an IDE configured according to one embodiment of the present invention.

FIG. 3C is a screenshot illustrating IDE 300 configured according to one embodiment of the present invention. In the embodiment of IDE 300 described in FIGS. 3A and 3B, IDE 300 expands and maintains docked, variable-height panels, such as actions panel 303, swatches panel 304, and layers panel 305, to the entire vertical height of design space 301.

However, while IDE 300 attempts to maintain the vertical height of docked palettes 302, the user may modify the overall vertical height if he or she desires to view more of the design subject file within design space 301. The user drags end divider 308 to reveal more of design space 301. While the user drags end divider 308, IDE 300 removes more of filler space 307. Once all of filler space 307 would be removed, IDE 300 would begin covering up the content of any one of actions panel 303, swatches panel 304, and layers panel 305, depending on the particular implementation of the embodiment.

It should be noted that additional and/or alternative embodiments of the present invention may be implemented in embodiments of IDE 300 that do not expand and attempt to maintain the vertical height of docked palettes 302 to that of design space 301. FIG. 3C's illustrated screenshot may also, in this additional and/or alternative embodiment, show the alternative embodiment of IDE 300. For purposes of this alternative example embodiment, docked palettes 302 originally begins with actions panel 303 displaying more information, such that end divider 308, adjacent to layers panel 305, is located at the bottom of design space 301. As the user moves divider 306, IDE 300 conceals some of the information in actions panel 303, end divider 308 rises at the same rate as the user is moving end divider 308. Thus, as the user shrinks the size of actions panel 303, more of design space 301 is revealed under layers panel 305.

Figure 4A:
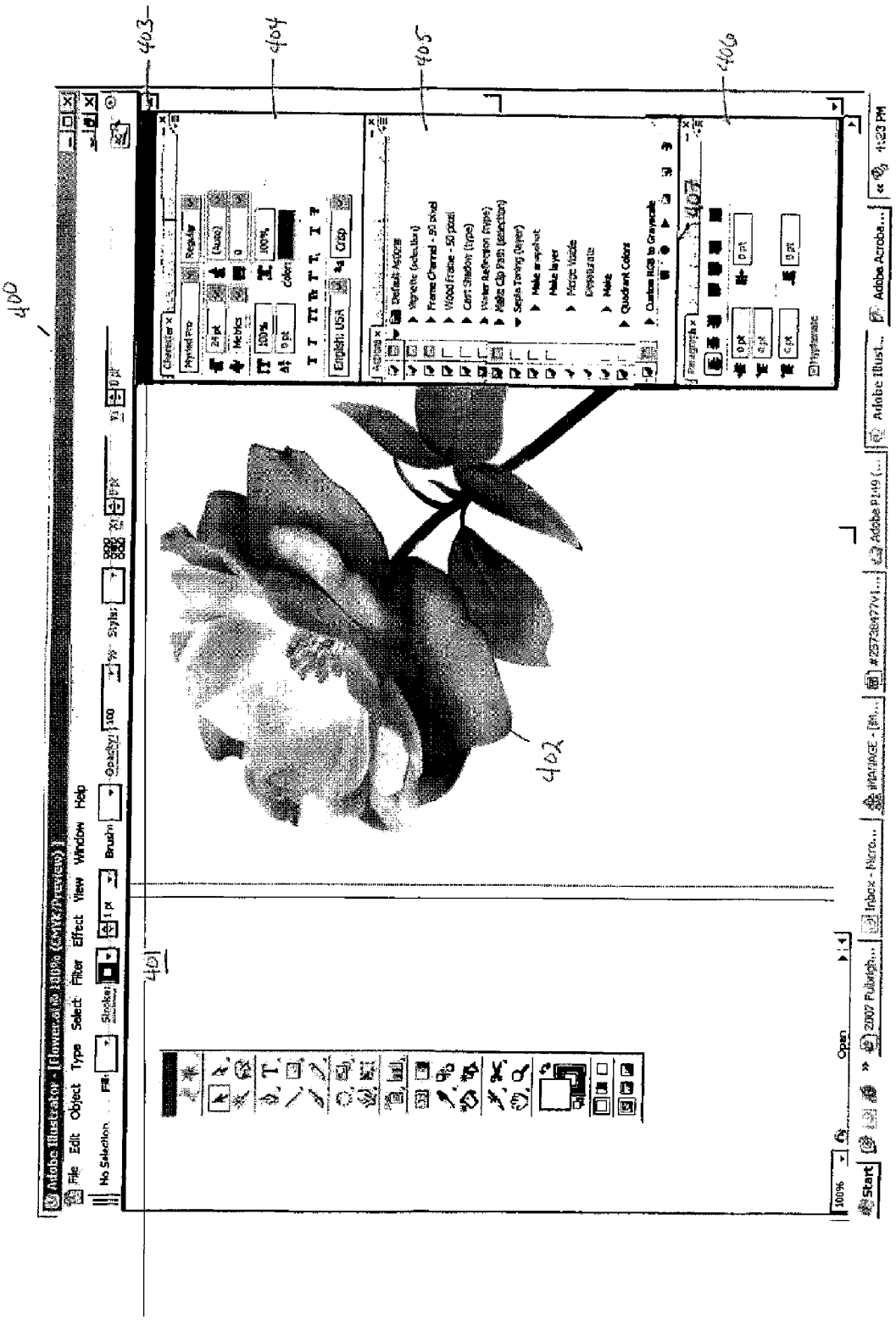
FIG. 4A is a screenshot illustrating an IDE configured according to one embodiment of the present invention.
Figure 4B:
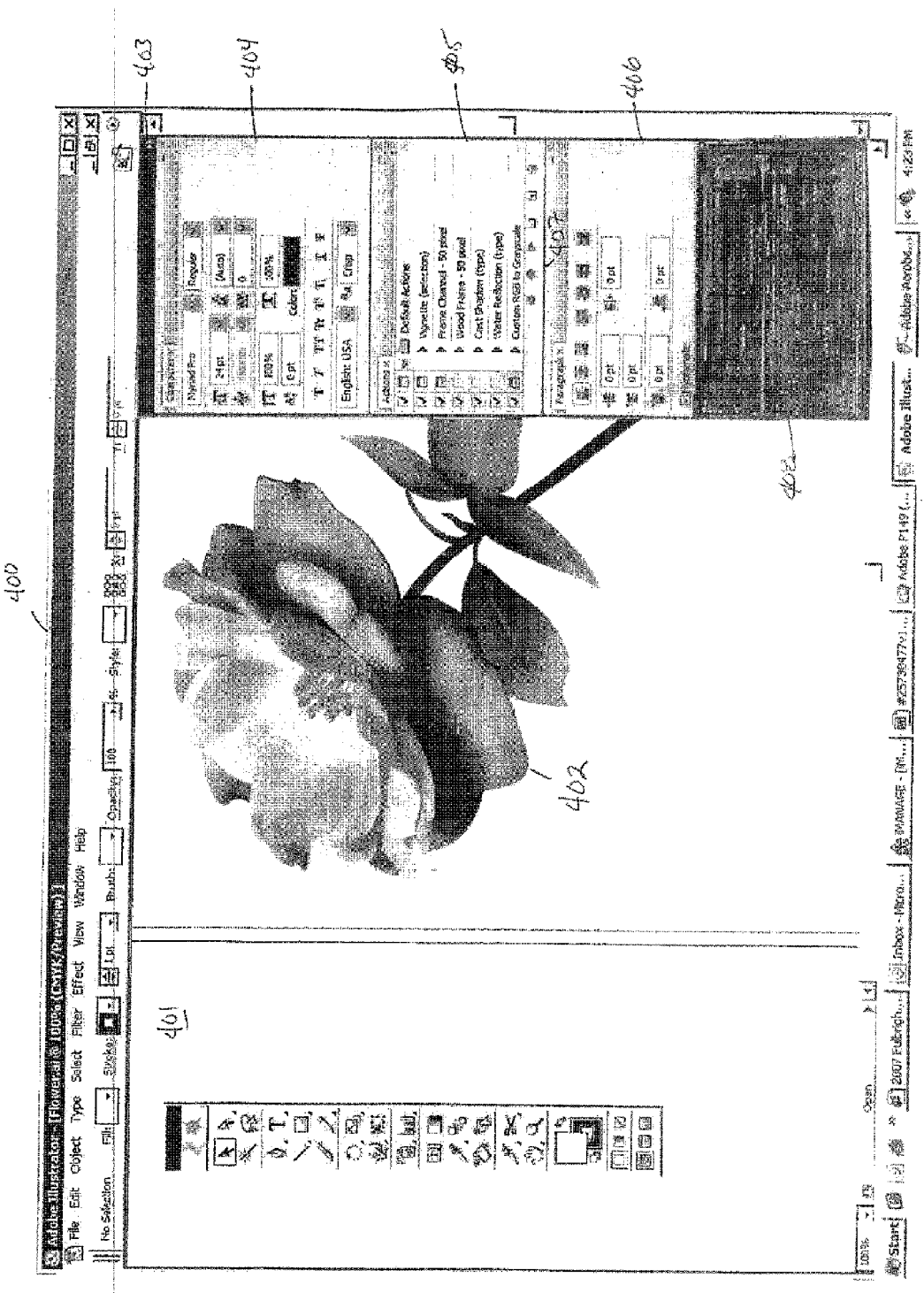
FIG. 4B is a screenshot illustrating an IDE after resizing the actions panel.

FIG. 4A is a screenshot illustrating IDE 400 configured according to one embodiment of the present invention. In the displayed embodiment, docked palettes 403 includes character panel 404, actions panel 405, and paragraph panel 406 docked on the edge of workspace 401. Character panel 404 and paragraph panel 406 are fixed-height panels, while actions panel 405 is a variable-height panel. When character panel 404, actions panel 405, and paragraph panel 406 are docked into docked palettes 403, IDE 400 expands the height to match the height of workspace 401 because of variable-height panel, actions panel 405. The user desires to resize actions panel 405 by dragging divider 407. FIG. 4B is a screenshot illustrating IDE 400 after resizing actions panel 405.

After the user drags divider 407, IDE 400 conceals more of the information in actions panel 405. In order to maintain the height of docked palettes 403, filler space 408 is added below paragraphs panel 406. The size of paragraph panel 406 is not modified because it is a fixed-height panel. IDE 400 will, therefore, attempt to maintain the fixed height.

Figure 4C:
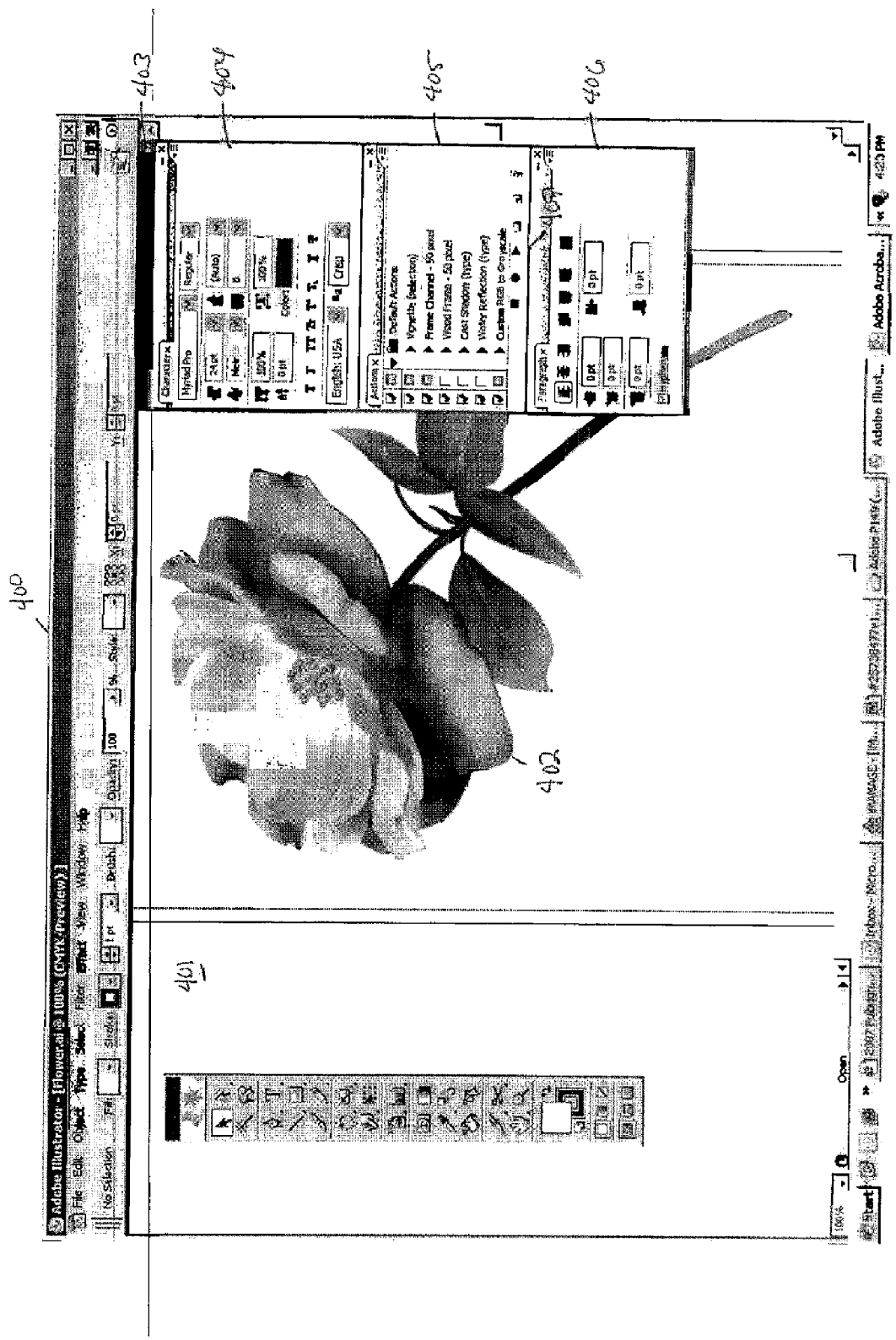
FIG. 4C is a screenshot illustrating an alternative embodiment of an IDE configured according to an additional and/or alternative embodiment of the present invention.

It should be noted that additional and/or alternative embodiments of the present invention, an IDE may not be configured to expand and maintain the height of the docked palettes, such as docked palettes 403 to the vertical height of workspace 401. FIG. 4C is a screenshot illustrating an alternative embodiment of IDE 400 configured according to an additional and/or alternative embodiment of the present invention. As the user modifies the size of actions panel 405 by dragging divider 407, IDE 400 maintains the fixed vertical size of both character panel 404 and paragraph panel 406 thereby revealing more of graphic 402 in workspace 401.

Figure 5A:
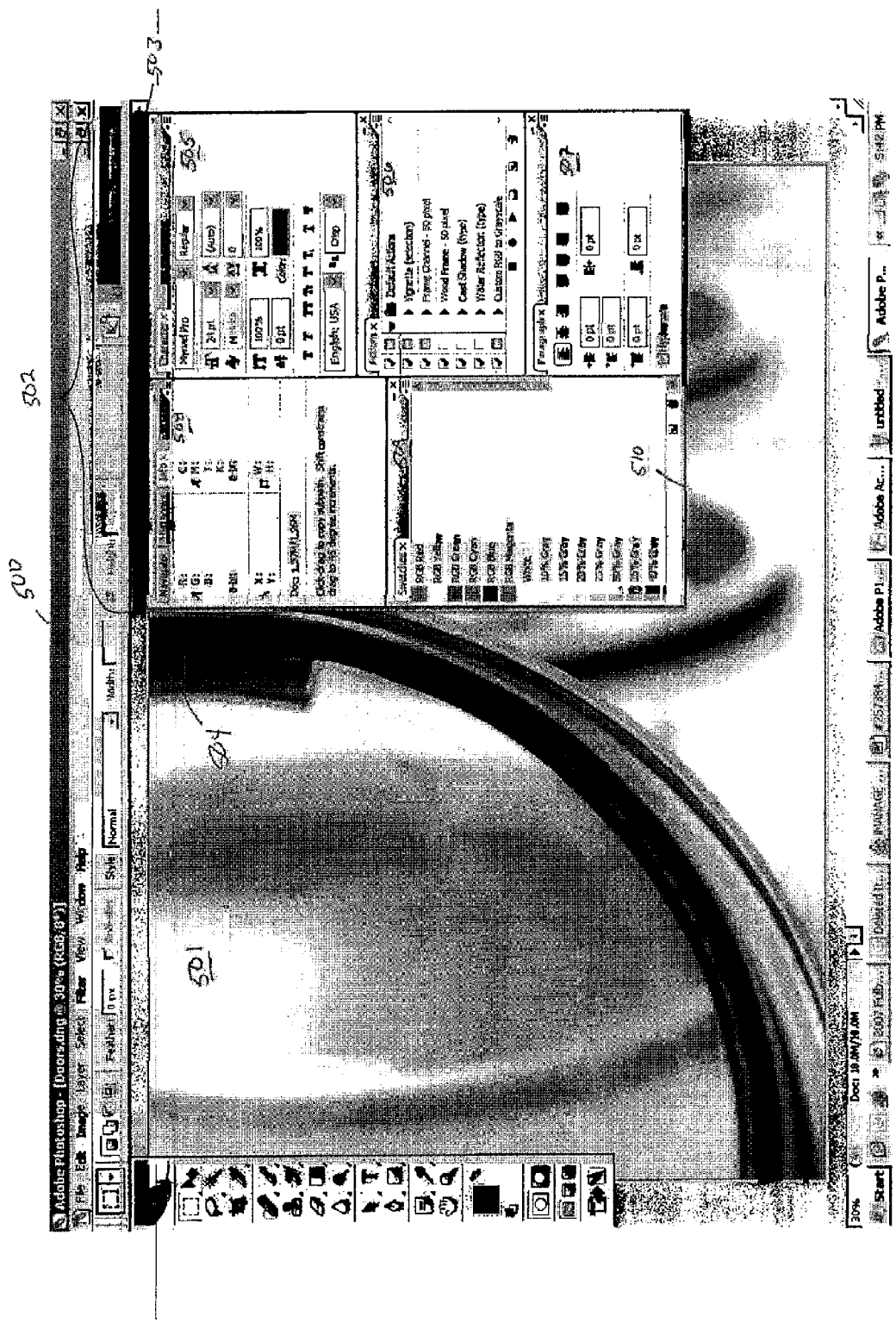
FIG. 5A is a screenshot illustrating an IDE configured according to one embodiment of the present invention.
Figure 5B:
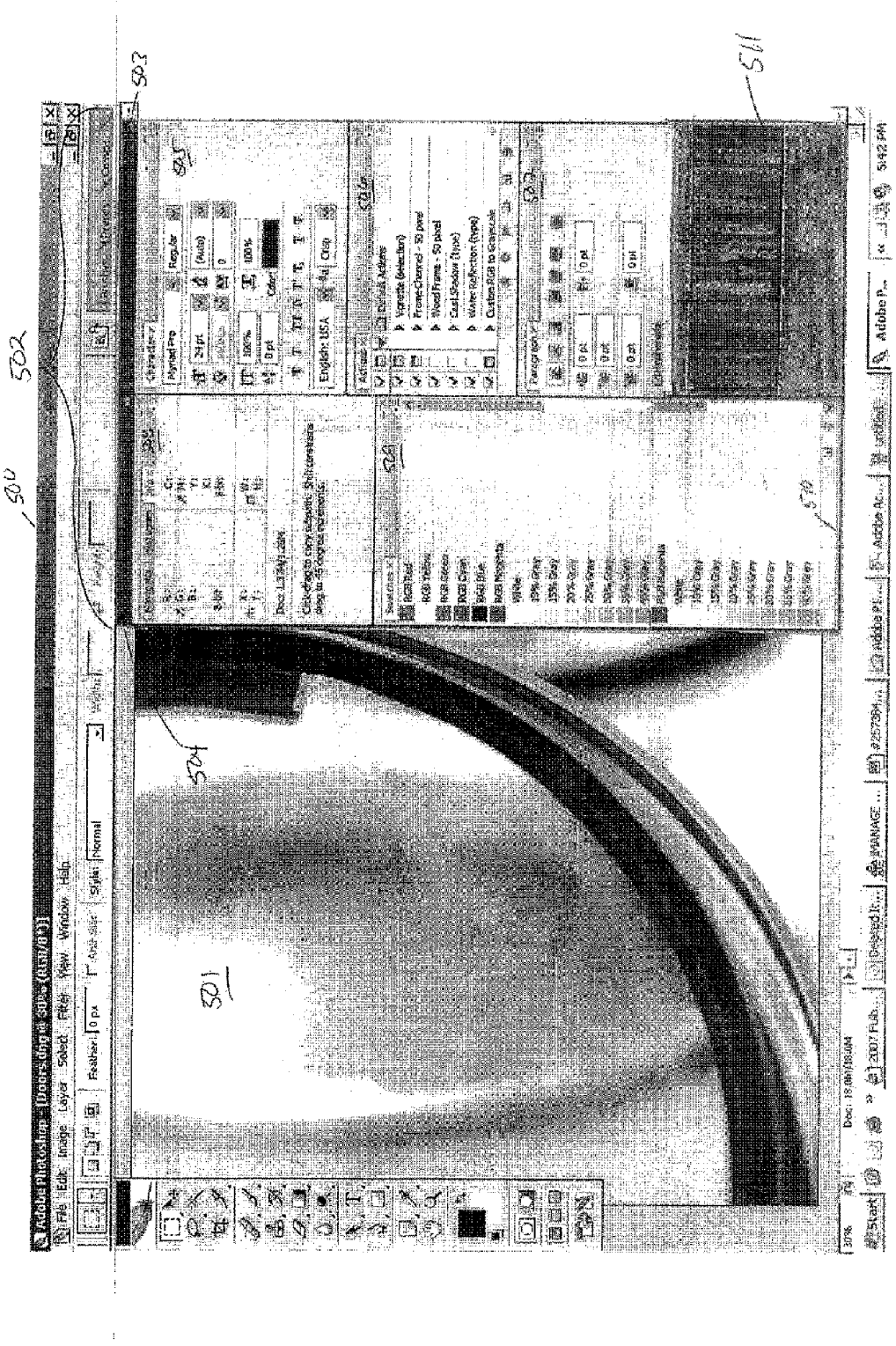
FIG. 5B is a screenshot illustrating the designer-controlled expansion of the swatches panel.

FIG. 5A is a screenshot illustrating IDE 500 configured according to one embodiment of the present invention. In operating within workspace 501, the designer may dock multiple panels and palettes in multiple columns. For example, docked palettes 502 comprises docked palette column 503, containing character panel 505, actions panel 506, and paragraph panel 507, and docked palette column 504, containing tabbed palettes 508 and swatches panel 509. In operation, the designer desires to increase the size of swatches panel 509 in order to view more of the options displayed therein. The designer would, therefore, drag end divider 510 to the desired size. FIG. 5B is a screenshot illustrating the designer-controlled expansion of swatches panel 509.

Character panel 505 and paragraph 507 are both fixed-height palettes within docked palette column 503. Even though the designer selects only to increase the size of swatches panel 509, IDE 500 increases the entire size of docked palettes 502 by adding filler space 511 below paragraphs panel 507 to maintain the consistency of size between docked palette columns 503 and 504. IDE 500 maintains this consistency to avoid creating a non-contiguous window into workspace 501. The discontinuity which would result by creating this window could potentially lead to confusion to the designer and may reduce the overall user experience.

It should be noted that additional and/or alternative embodiments of the present invention may not add filler space 511, but may select to reveal more of the content contained in variable-height panel, actions panel 506, thus, modifying the height of the variable height panels when available, and reserving the addition of filler space 511 for below a fixed-height panel only when no variable-height panels are within docked palette column 503.

Figure 6A:
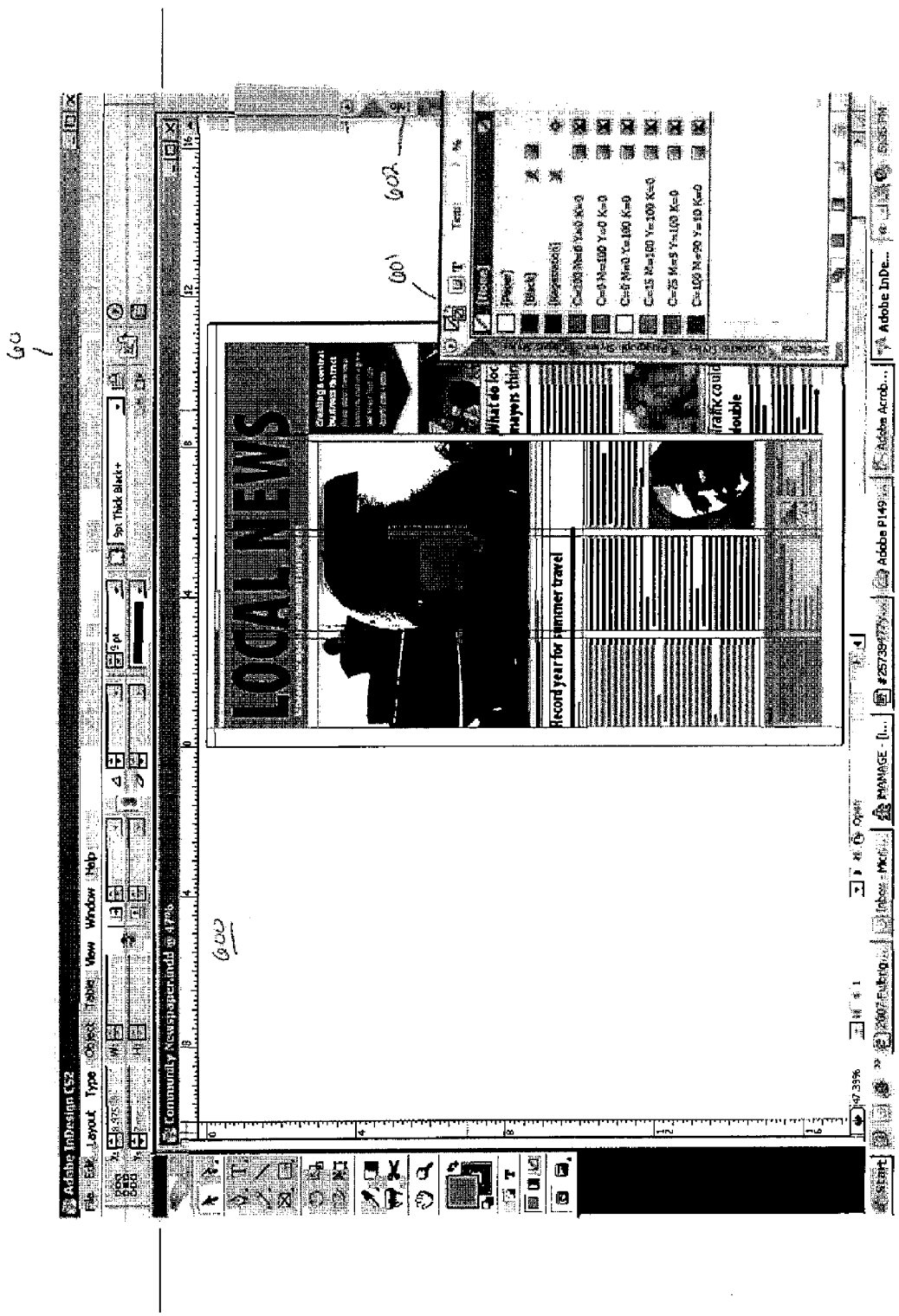
FIG. 6A is a screenshot illustrating a typically operating IDE.
Figure 6B:
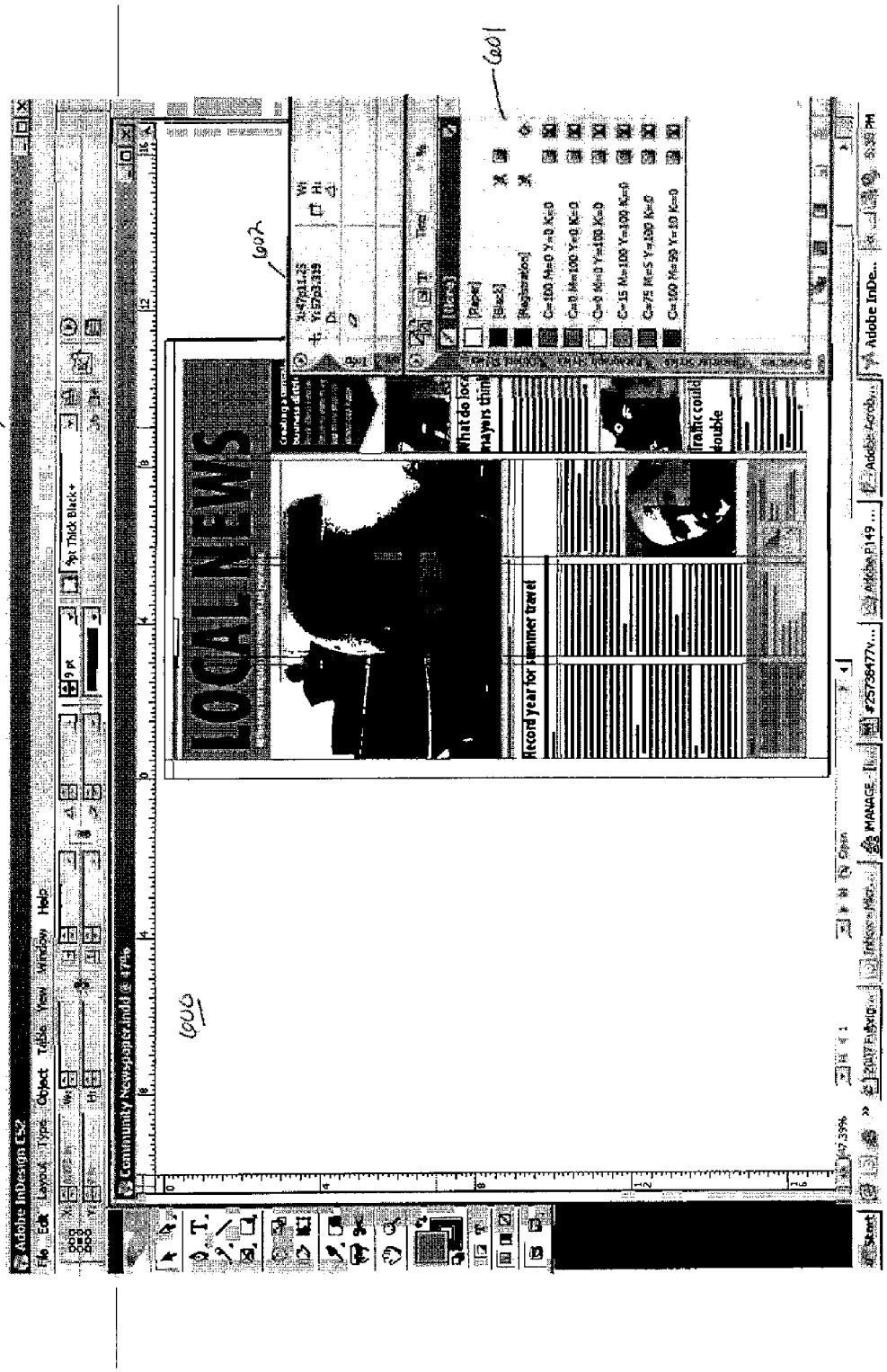
FIG. 6B is a screenshot of the IDE in which one of the tool panels has also been activated by the user prior to activating the other tool panel.
Figure 16C:
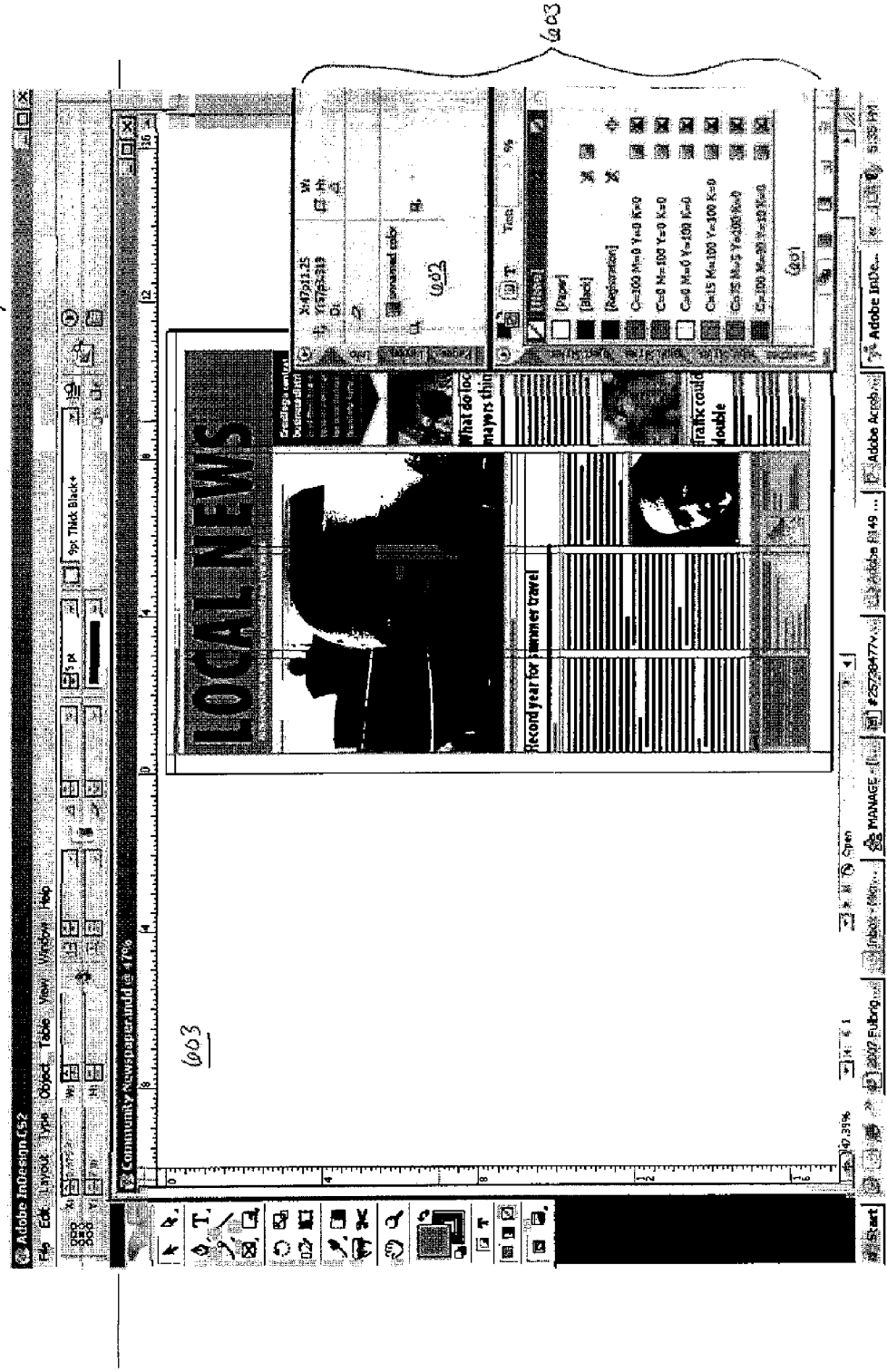

FIG. 6A is a screenshot illustrating a typically operating IDE, IDE 60. IDE 60 provides tool and function panels in a stashed panel format. Thus, when not in use, tool panels, such as tool panel 601 and 602 are hidden off of the edge of workspace 600. FIG. 6A illustrates tool panel 601 as activated by the user to view the available options and information within tool panel 601. As displayed, tool panel 601 partially obscures the menu tabs of tool panel 602. This overlapping that occurs may inhibit the users ability to easily cycle between the various tool panels that he or she desires to use. FIG. 6B is a screenshot of IDE 60 in which tool panel 602 has also been activated by the user prior to activating tool panel 601. The configuration displayed in FIG. 6B illustrates the problems with the management of tool panels found in existing IDEs. Here, when tool panels 601 and 602 are activated, tool panel 601 overlaps tool panel 602 and conceals much of the information and options of tool panel 602.

FIG. 6C is a screenshot illustrating IDE 61 configured according to one embodiment of the present invention. IDE 61 offers the capability to stash tool panels as illustrated in FIGS. 6A and 6B, but, when configured according to one embodiment of the present invention. IDE 61 manages the vertical positioning and arrangement of each of the panels docked on the edge of workspace 603. In offering the same tool panels, tool panels 601 and 602, when docked into docked palettes 603, IDE 61 ensures that there is not overlapping of tool panels 601 and 602. As illustrated, when tool panels 601 and 602 are activated, neither one overlaps or obscures any of the content of the other tool panel. Thus, by monitoring and maintaining the layout of tool panels 601 and 602 in docked palettes 603, the user is presented a more organized and usable design environment.

Figure 7:
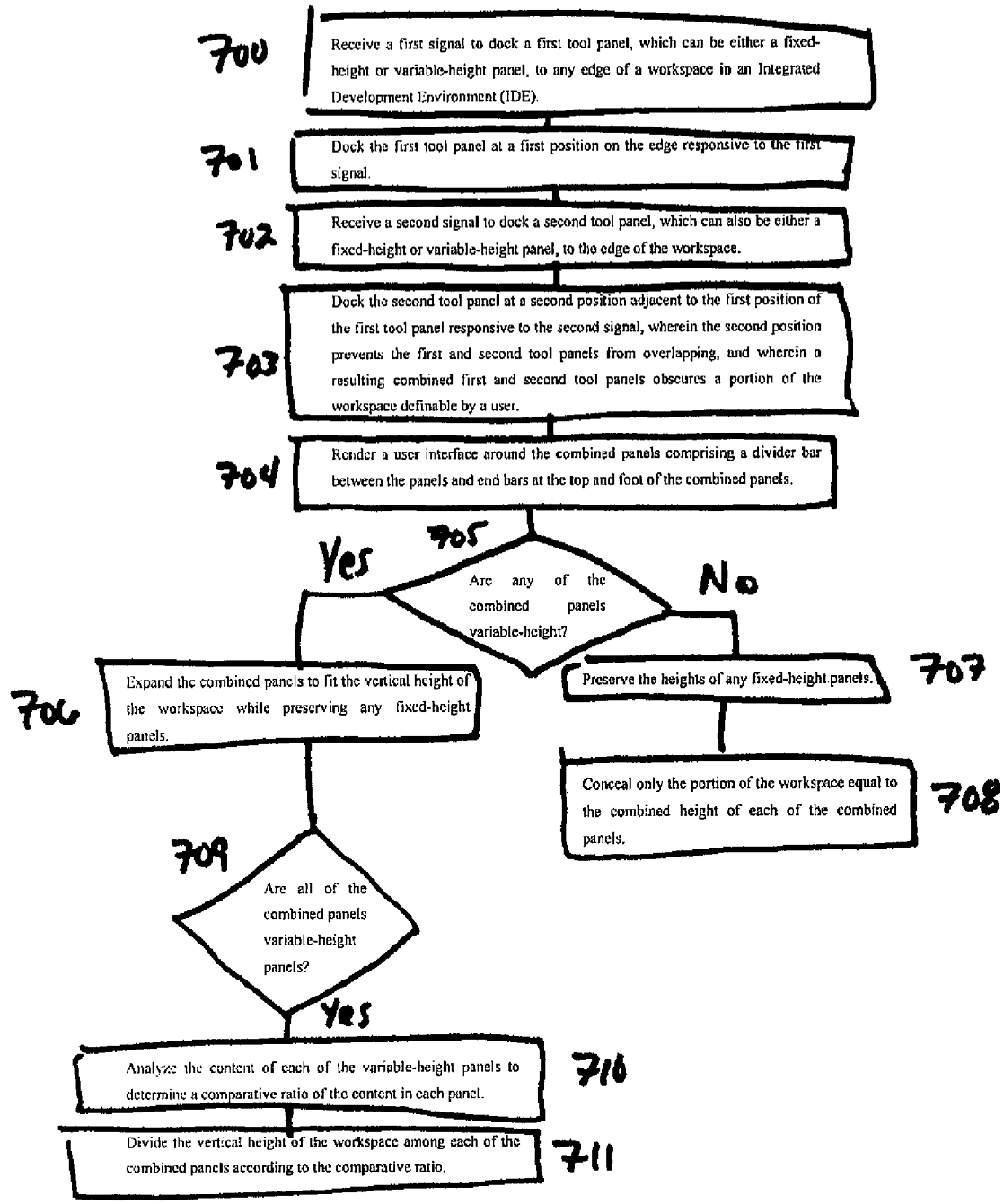
FIG. 7 is a flowchart illustrating example steps executed to implement one embodiment of the present invention.

FIG. 7 is a flowchart illustrating example steps executed to implement one embodiment of the present invention. In step 700, a first signal is received to dock a first tool panel, which can be either a fixed-height or variable-height panel, to any edge of a workspace in an Integrated Development Environment (IDE). The first tool panel is docked at a first position on the edge, in step 701, responsive to the first signal. In step 702, a second signal is received to dock a second tool panel, which can also be either a fixed-height or variable-height panel, to the edge of the workspace. The second tool panel is docked at a second position adjacent to the first position of the first tool panel, in step 703, responsive to the second signal, wherein the second position prevents the first and second tool panels from overlapping, and wherein a resulting combined first and second tool panels obscures a portion of the workspace definable by a user. A user interface is rendered around the combined panels, in step 704, comprising a divider bar between the panels and end bars at the top and foot of the combined panels. In step 705, a determination is made whether any of the combined panels are variable-height panels. If so, then, in step 706, the combined panels are expanded to fit the vertical height of the workspace while preserving the height of any fixed-height panels. If not, then, in step 707, the heights of any fixed-height panels are preserved and, in step 708, only the portion of the workspace equal to the combined height of each of the combined panels is concealed. In step 709, a determination is made whether all of the combined panels are variable-height panels. If so, then, in step 710, the content of each of the variable-height panels is analyzed to determine a comparative ratio of the content in each panel. The vertical height of the workspace is then divided, in step 711 among each of the combined panels according to the comparative ratio.

It should be noted that the example steps illustrated in FIG. 7 represent one embodiment that includes various modifications to the docked palette as operated by a designer. Additional and/or alternative embodiments that represent a method or process may provide a more basic operation without extensively modifying or customizing the resulting docked palette.

FIG. 8 is a flowchart illustrating example steps executed to implement one embodiment of the present invention. In step 800, an indication is received to dock one or more palettes to one of a plurality of edges of an electronic workspace. The individual palettes, which may be a single panel or individual tabbed palettes, are joined, in step 801, into a docked palette, wherein each of the individual palettes are positioned to prevent overlapping any of the other palettes. The docked palette is fixed, in step 802, to the selected edge. One or more user interface controls associated with the docked palette are displayed in step 803. In step 805, manipulation is detected from any of the user interface controls, where the manipulation affects an amount of electronic workspace that is concealed by the docked palette.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 9:
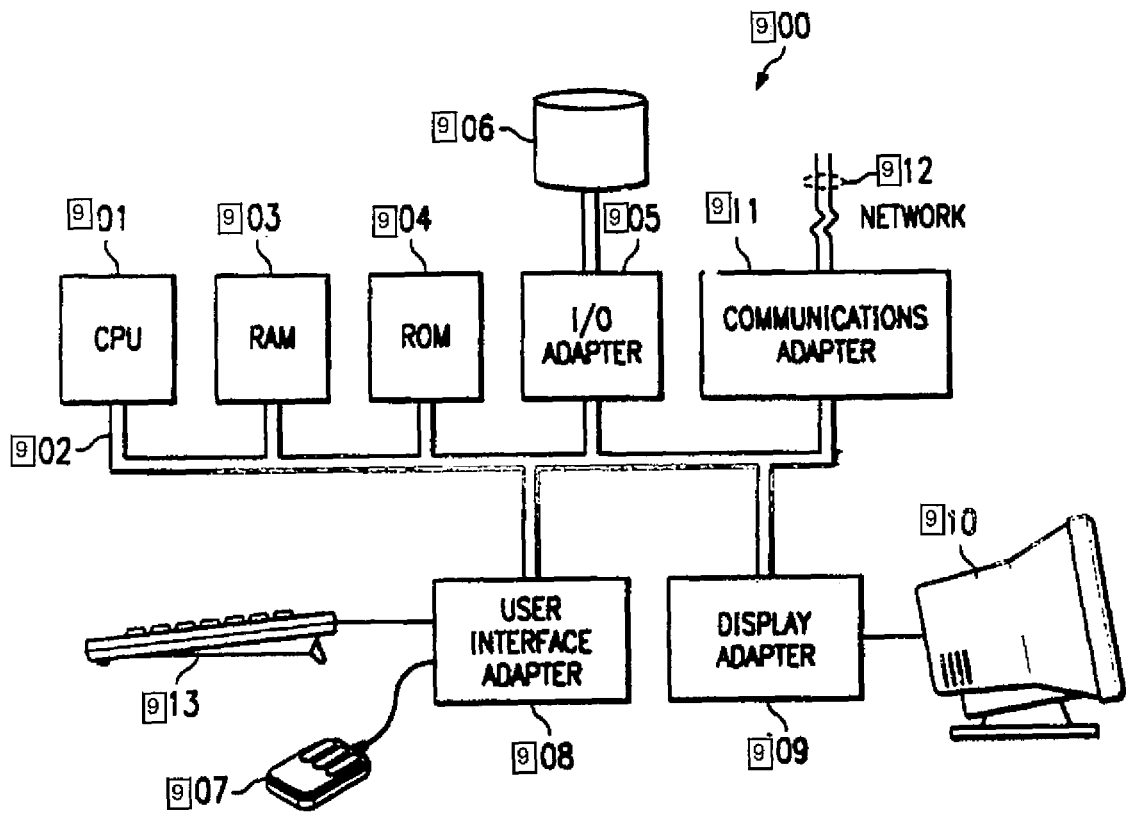
FIG. 9 illustrates a computer system adapted to use embodiments of the present invention.

FIG. 9 illustrates computer system 900 adapted to use embodiments of the present invention, e.g. storing and/or executing software associated with the embodiments. Central processing unit (CPU) 901 is coupled to system bus 902. The CPU 901 may be any general purpose CPU. However, embodiments of the present invention are not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) controller card 905, communications adapter card 911, user interface card 908, and display card 909. The I/O adapter card 905 connects storage devices 906, such as one or more of a hard drive, a CD drive, a floppy disk drive, a tape drive, to computer system 900. The I/O adapter 905 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 911 is adapted to couple the computer system 900 to a network 912, which may be one or more of a telephone network, a local (LAN) and/or a wide-area (WAN) network, an Ethernet network, and/or the Internet network. User interface card 908 couples user input devices, such as keyboard 913, pointing device 907, and the like, to the computer system 900. The display card 909 is driven by CPU 901 to control the display on display device 910.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a first signal to dock a first tool panel to an edge of a workspace in an Integrated Development Environment (IDE), wherein the first tool panel comprises one of a variable-height panel and a fixed-height panel;
   docking the first tool panel at a first position on the edge responsive to the first signal;
   responsive to the docking of the first tool panel, expanding a vertical height of the first tool panel to a height of the workspace when the first tool panel comprises a variable-height panel;
   receiving a second signal to dock a second tool panel to the edge of the workspace, wherein the second tool panel comprises one of a variable-height panel and a fixed-height panel;
   docking the second tool panel at a second position adjacent to the first position of the first tool panel responsive to the second signal, wherein the first and second tool panels do not overlap one another; and
   wherein a resulting combined first and second tool panels obscures only a portion of said workspace determined necessary to display the first and second tool panels.

2. The method of claim 1 further comprising:
   responsive to the docking of the second tool panel, reducing the vertical height of the first tool panel by a size of the second tool panel when the second tool panel comprises a fixed-height panel, wherein a combined height of the first and second tool panels remains the height of the workspace.

3. The method of claim 1 further comprising:
   responsive to the docking of the second tool panel, reducing the vertical height of the first tool panel to one-half of the height of the workspace when the second tool panel comprises a variable-height panel, wherein a combined height of the first and second tool panels remains the height of the workspace.

4. The method of claim 1 further comprising:
   responsive to the docking of the second tool panel, determining a comparative ratio of a content of each of the first and second tool panels when the second tool panel comprises a variable-height panel;
   allocating a portion of a combined height of the first and second tool panels to each of the first and second tool panels according to the comparative ratio, wherein the combined height remains the height of the workspace.

5. The method of claim 1, further comprising:
   rendering a divider bar between the first and second tool panels on the combined first and second tool panels;
   rendering an end bar at a top edge of the combined first and second tool panels and at a bottom edge of the combined first and second tool panels;
   wherein the divider and the end bars provide a user interface for resizing the combined first and second tool panels.

6. The method of claim 5 further comprising:
   receiving one or more edit signals corresponding to dragging one or more of the divider bar and the end bars; and
   responsive to the one or more edit signals, modifying a height of one or more of the first and second tool panels.

7. The method of claim 6 wherein modifying the height of one or more of the first and second tool panels comprises one of:
   modifying a combined height of the combined first and second tool panels when the one or more edit signals are related to the dragging of the divider bar; and
   modifying the height of one of the first and second tool panels when the one or more edit signals is related to the dragging of at least one of the end bars, wherein the modification affects obscuration of the portion of the workspace.

8. The method of claim 1, further comprising:
   receiving a docking signal to dock a third tool panel to a vertical side of the combined first and second tool panels; and
   docking the third tool panel in a second column position adjacent to the combined first and second tool panels, wherein the third tool panel and the combined first and second tool panels do not overlap one another, wherein a portion of the workspace obscured by the docked first, second, and third tool panels is definable by a user.

9. The method of claim 8 further comprising:
   receiving one or more edit signals to modify a height of the third tool panel; and changing the height of the third tool panel according to the one or more edit signals.

10. The method of claim 1 wherein the edge comprises any boundary of the workspace.

11. The method of claim 1 wherein the first and second tool panels comprise one of a single tool panel and a tabbed palette.

12. The method of claim 1, wherein the portion of the workspace obscured by the combined first and second tool panels can be adjusted by a user.

13. The method of claim 1, wherein a resulting combined first and second tool panels obscures only a portion of said workspace determined necessary to display the fixed horizontal widths of the first and second tool panels.

14. The method of claim 1, wherein a resulting combined first and second tool panels obscures only an area necessary to display:
a portion of the workspace obscured by the first tool panel after docking;
a portion of the workspace obscured by the second tool panel after docking; and
a portion of the workspace obscured by a user interface element for resizing the resulting combined first and second tool panels.

15. The method of claim 1, further comprising:
receiving an additional signal to dock an additional tool panel to the edge of the workspace; and
docking the additional tool panel at an additional position adjacent to the combined first and second tool panels, wherein the additional tool panel and the combined first and second tool panels do not overlap one another; and
wherein a resulting combined tool panels obscures only said portion of said workspace determined necessary to display the first, second, and additional tool panels.

16. A computing system comprising:
a processor;
a memory that stores instructions associated with an electronic media development environment application executed by the processor; and
an interconnect coupling the processor and the memory, enabling the computing system to execute the electronic media development environment application and configure the processor to:
(i) display a first tool panel and a second tool panel in a workspace, wherein the first tool panel comprises one of a variable-height panel and a fixed-height panel;
(ii) receive a first signal to dock the first tool panel to an edge of the workspace;
(iii) dock the first tool panel at a first position on the edge responsive to the first signal;
(iv) expand a vertical height of the first tool panel to a height of the workspace in response to docking the first tool panel when the first tool panel comprises a variable-height panel;
(v) receive a second signal to dock the second tool panel to the edge of the workspace, wherein the second tool panel comprises one of a variable-height panel and a fixed-height panel;
(vi) dock the second tool panel at a second position adjacent to the first position of the first tool panel responsive to the second signal, wherein the first and second tool panels do not overlap one another; and
(vii) wherein a resulting combined first and second tool panels obscures only a portion of said workspace determined necessary to display the first and second tool panels.

17. The computing system of claim 16, wherein the electronic media development environment application configures the processor to reduce the vertical height of the first tool panel by a size of the second tool panel in response to docking the second tool panel when the second tool panel comprises a fixed-height panel, wherein a combined height of the first and second tool panels remains the height of the workspace.

18. The computing system of claim 16, wherein the electronic media development environment application configures the processor to reduce the vertical height of the first tool panel to one-half of the height of the workspace when the second tool panel comprises a variable-height panel, wherein a combined height of the first and second tool panels remains the height of the workspace.

19. The computing system of claim 16 wherein the electronic media development environment application configures the processor to determine a comparative ratio of a content in each of the first and second tool panels; and
allocate a portion of a combined height of the first and second tool panels to each of the first and second tool panels according to the comparative ratio, wherein the combined height remains the height of the workspace.

20. The computing system of claim 16, wherein the electronic media development environment application configures the processor to:
render a divider bar between the combined first and second tool panels; render an
end bar at a top edge of the combined first and second tool panels and at a bottom edge of the combined first and second tool panels; and
wherein the divider and the end bars provide a user interface for resizing the combined first and second tool panels.

21. The computing system of claim 20 wherein the electronic media development environment application configures the processor to:
receive one or more edit signals corresponding to dragging one or more of the divider bar and the end bars; and
modify a height of one or more of the first and second tool panels in response to receiving the one or more edit signals.

22. The computing system of claim 21, wherein the electronic media development environment application configures the processor to modify the height by performing one of:
modifying a combined height of the resulting combined first and second tool panels when the one or more edit signals are related to the dragging of the divider bar; and
modifying the size of one of the first and second tool panels when the one or more edit signals related to the dragging of the end bar, wherein the modification affects obscuration of the portion of the workspace.

23. The computing system of claim 16, wherein the electronic media development environment application configures the processor to:
receive a docking signal to dock a third tool panel to a vertical side of the combined first and second tool panels; and
dock the third tool panel in a second column position adjacent to the combined first and second tool panels,
wherein the second column position prevents the third tool panel and the combined first and second tool panels from overlapping, and
wherein the portion of the workspace obscured by the docked first, second, and third tool panels is equal to a combination of a portion of the workspace obscured by the combined first and second tool panels, a portion of the workspace obscured by the third tool panel, and a portion of the workspace obscured by a user interface for resizing the docked first, second, and third tool panels.

24. The computing system of claim 23 wherein the electronic media development environment application configures the processor to:
receive one or more edit signals to modify a height of the third tool panel; and change the height of the third tool panel according to the one or more edit signals.

25. The computing system of claim 16, wherein the electronic media development environment application configures the processor to:
receive an additional signal to dock an additional tool panel to the edge of the workspace; dock the additional tool panel at an additional position adjacent to the combined first and second tool panels, wherein the additional tool panel and the combined first and second tool panels do not overlap one another; and
wherein a resulting combined tool panels obscures only said portion of said workspace determined necessary to display the first, second, and additional tool panels.

* * * * *